US009154653B2

(12) United States Patent
Nakatsu

(10) Patent No.: US 9,154,653 B2
(45) Date of Patent: Oct. 6, 2015

(54) NUMERICAL VALUE INPUTTING DEVICE AND ELECTRONIC EQUIPMENT

(71) Applicant: KYOCERA Document Solutions Inc., Osaka (JP)

(72) Inventor: Kenta Nakatsu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/327,266

(22) Filed: Jul. 9, 2014

(65) Prior Publication Data
US 2015/0036159 A1  Feb. 5, 2015

(30) Foreign Application Priority Data

Jul. 31, 2013 (JP) ................................ 2013-158695
Mar. 19, 2014 (JP) ................................ 2014-056126

(51) Int. Cl.
H04N 1/00 (2006.01)
G06F 3/12 (2006.01)
G06F 3/041 (2006.01)
G06F 3/0488 (2013.01)
G06K 15/02 (2006.01)
G06K 15/00 (2006.01)
G06F 3/0484 (2013.01)

(52) U.S. Cl.
CPC .......... *H04N 1/00411* (2013.01); *G06F 3/0412* (2013.01); *G06F 3/04847* (2013.01); *G06F 3/04883* (2013.01); *G06K 15/005* (2013.01); *H04N 1/00392* (2013.01); *G06F 2203/04104* (2013.01); *G06F 2203/04808* (2013.01); *H04N 2201/0094* (2013.01)

(58) Field of Classification Search
None
See application file for complete search history.

(56) References Cited

U.S. PATENT DOCUMENTS

| 6,310,613 | B1* | 10/2001 | Tanaka et al. ................. 345/173 |
|---|---|---|---|
| 2011/0069012 | A1 | 3/2011 | Martensson |
| 2011/0234518 | A1 | 9/2011 | Maruyama |
| 2012/0223897 | A1* | 9/2012 | Hamada ........................ 345/173 |
| 2012/0327003 | A1 | 12/2012 | Matsumura |
| 2013/0162544 | A1* | 6/2013 | Yang et al. .................... 345/173 |
| 2014/0108984 | A1* | 4/2014 | Kunori .......................... 715/771 |

FOREIGN PATENT DOCUMENTS

| JP | 2011-003977 A | 1/2011 |
|---|---|---|
| JP | 2011-198165 A | 10/2011 |
| WO | 2011/041885 A1 | 4/2011 |

OTHER PUBLICATIONS

The extended European search report issued by the European Patent Office on Dec. 17, 2014, which corresponds to European Patent Application No. 14176246.8-1972 and is related to U.S. Appl. No. 14/327,266.

* cited by examiner

Primary Examiner — Beniyam Menberu
(74) Attorney, Agent, or Firm — Studebaker & Brackett PC

(57) ABSTRACT

A numerical value inputting device includes a touch panel and a digit number changing part. The touch panel includes a display face to display a numerical value display area and detects simultaneously two pressed positions onto the display face. The digit number changing part changes the number of digits of a numerical value displayed on the numerical value display area in accordance with separation or approach of the two pressed positions.

12 Claims, 14 Drawing Sheets

NUMERICAL VALUE INPUTTING DEVICE AND ELECTRONIC EQUIPMENT

INCORPORATION BY REFERENCE

This application is based on and claims the benefit of priority from Japanese Patent application No. 2013-158695 filed on Jul. 31, 2013, and Japanese Patent application No. 2014-056126 filed on Mar. 19, 2014, the entire contents of which are incorporated herein by reference.

BACKGROUND

The present disclosure relates to a numerical value inputting device and electronic equipment including the numerical value inputting device.

In an office or the like, a multifunction peripheral (MFP) having functions as a scanner, a facsimile, a printer, a copying machine and others is used. The multifunction peripheral is often used, for example, in a condition of being connected an information processing terminal, such as a personal computer via a network, such as a local area network (LAN). The multifunction peripheral works as an image forming apparatus printing image data inputted from the information processing terminal onto a sheet, an image reading device obtaining the image data used in the image forming apparatus and a document managing device searchably storing document image data.

Instruction of a user to the multifunction peripheral having the functions is inputted, for example, via an operation device arranged to the multifunction peripheral. As the operation device, an operation device provided with a touch panel is widely used. As is well known, the touch panel has a function of a display device and a function of an inputting device to display operation buttons and others and to detect a pressed position (a touched position) by a sensor or the like arranged on a display face. The operation device provided with such a touch panel is applied to various devices, not only the multifunction peripheral. Various technologies are proposed in order to improve operability of the user.

For example, as the operation device, there is operation equipment displaying an inputting part inputting a numerical value at the same position even if an operating mode of an operated device having a plurality of operating modes is changed.

Alternatively, as the operation device, there is a display device increasing the number of thumbnail images displaying content of movie data in accordance with an action of expanding a distance among a plurality of operation inputs.

In a case where the input is performed by using the touch panel, it is necessary to simultaneously display, on the display face, a display area displaying an inputted character string or an inputted numerical value and an input interface, such as input buttons, inputting the character string or the numerical value. In order to arrange the input interface considering button intervals to be operated by the user, a large screen size to some extent is required. However, in an embedding device or the like, due to various restrictions, such as a limit of cost or size or a functional limit, it is often difficult to arrange the touch panel of the large screen size.

If the touch panel of a small screen size is applied, because the input interface having many operation buttons is arranged on the touch panel, the display area becomes narrow and visibility is lowered. Therefore, it is necessary to minimize a ratio of the input interface in the touch panel. However, if the number of the operation buttons or the like of the input interface is reduced and the display area is enlarged, the operability of the input interface is lowered.

For example, if numeric keys for numerical value input are arranged as the input interface, the numerical value input is facilitated, but the display area is reduced and the visibility is lowered. On the other hand, if a numerical value increasing button and a numerical value decreasing button are arranged as the input interface, the display area may be enlarged, but the operability of the numerical value input is lowered. For example, in order to input large numerical value, the numerical value increasing button must be continuously operated.

It may be considered that hard keys are arranged as the input interface. However, since the display face of the touch panel may display various operation buttons according to various functions provided in the operated device, the hard key tends to be removed in the operation device including the touch panel. Therefore, it is not preferable to arrange the hard key.

The subject securing operability regardless the small screen size cannot be achieved by the above-mentioned techniques.

SUMMARY

In accordance with one aspect of the present disclosure, a numerical value inputting device includes a touch panel and a digit number changing part. The touch panel includes a display face to display a numerical value display area and detects simultaneously two pressed positions onto the display face. The digit number changing part changes the number of digits of a numerical value displayed on the numerical value display area in accordance with separation or approach of the two pressed positions.

In accordance with another aspect of the present disclosure, electronic equipment includes a numerical value inputting device. The numerical value inputting device includes a touch panel and a digit number changing part. The touch panel includes a display face to display a numerical value display area and detects simultaneously two pressed positions onto the display face. The digit number changing part changes the number of digits of a numerical value displayed on the numerical value display area in accordance with separation or approach of the two pressed positions.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, with reference to the drawings, an embodiment of the present disclosure will be described in detail. As follows, the present disclosure may be actualized as a digital multifunction peripheral.

Figure 1:
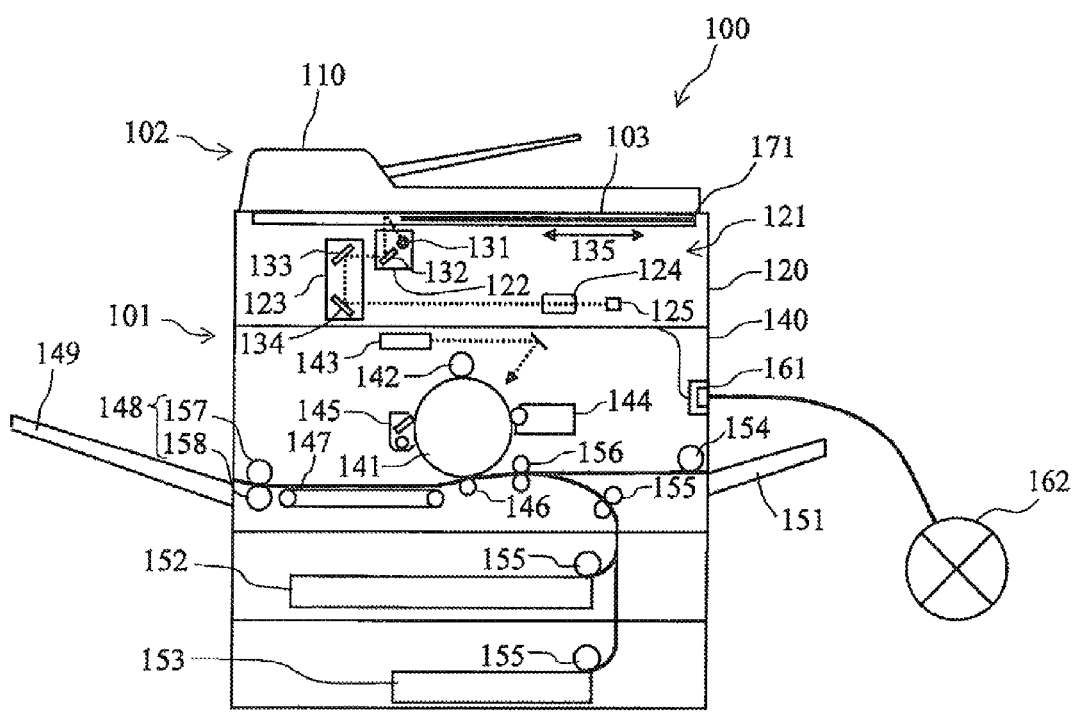
FIG. 1 is a schematic diagram showing an entire structure of a multifunction peripheral according to an embodiment of the present disclosure.

FIG. 1 is a schematic diagram showing an entire structure of the digital multifunction peripheral as an example according to the embodiment. As shown in FIG. 1, the multifunction peripheral 100 (electronic equipment) is provided with a main body 101 and a platen cover 102. The main body 101 includes an image reading part 120 and an image forming part 140. The platen cover 102 is attached above the main body 101. In an upper face of the main body 101, a document platen 103 made of a transparent board, such as a contact glass, is arranged, and the document platen 103 is configured so as to open and close by the platen cover 102. The platen cover 102 includes a document conveying device 110. In a front face of the multifunction peripheral 100, an operation panel 171 is arranged so as to allow a user to give a copy start or other instruction to the multifunction peripheral 100 and to confirm a condition or a setting of the multifunction peripheral 100.

Below the document platen 103, the image reading part 120 is arranged. The image reading part 120 reads an image of a document by a scanning optical system 121 and creates digital data (image data) of the image. The document may be placed on the document platen 103 or the document conveying device 110. The scanning optical system 121 includes a first carriage 122, a second carriage 123 and a light condensing lens 124. In the first carriage 122, a linear light source 131 and a mirror 132 are arranged and, in the second carriage 123, mirrors 133 and 134 are arranged. The light source 131 irradiates the document. The mirror 132, 133 and 134 leads a reflected light from the document to the light condensing lens 124 and the light condensing lens 124 images a light image on a light receiving surface of a line image sensor 125.

In this scanning optical system 121, the first carriage 122 and second carriage 123 are arranged so as to reciprocate in a sub scanning direction 135. By moving the first carriage 122 and second carriage 123 in the sub scanning direction 135, the image sensor 125 can read the image of the document placed on the document platen 103. In a case of reading the image of the document set on the document conveying device 110, the image reading part 120 aligns the first carriage 122 and second carriage 123 with an image reading position, temporarily stops those and reads the image of the document passing through the image reading position by the image sensor 125. The image sensor 125 creates the image data of the document from the light image incident on the light receiving surface.

The created image data can be printed on a sheet by the image forming part 140. The created image data can be outputted via a network interface 161 and transmitted via a network 162 to other equipment (not shown).

The image forming part 140 prints the image data obtained in the image reading part 120 and the image data received via the network interface 161 from the other equipment connected to the network 162 on the sheet.

The image forming part 140 is provided with a photosensitive drum 141. The photosensitive drum 141 is rotated at a constant rate in one direction. Around the photosensitive drum 141, a charger 142, an exposure device 143, a development device 144 and a cleaning unit 145 are arranged in order from an upstream side in a rotating direction. The charger 142 electrically charges a surface of the photosensitive drum 141 evenly. The exposure device 143 irradiates the evenly charged surface of the photosensitive drum 141 with light beam according to the image data to form an electrostatic latent image on the photosensitive drum 141. The development device 144 applies a toner onto the electrostatic latent image to form a toner image on the photosensitive drum 141. The cleaning unit 145 cleans the surface of the photosensitive drum 141 by removing a waste toner remained on the surface of the photosensitive drum 141 after image transferring. By rotating the photosensitive drum 141, these processes are carried out in a series.

The image forming part 140 feeds the sheet from a manual bypass tray 151 or a sheet feeding cartridge 152 or 153 to a transferring part between the photosensitive drum 141 and a transferring roller 146. On the manual bypass tray 151 and in sheet feeding cartridge 152 and 153, various sheets of various sizes can be placed or stored. The image forming part 140 selects the sheet instructed by the user or the sheet according to automatically detected document size and feeds the selected sheets from the manual bypass tray 151 or the cartridge 152 or 153 by a feeding roller 154 or 155. The fed sheet is conveyed to the transferring part at a given timing by the conveying roller 154 or 155 or a paper stop roller 156. The sheet with the transferred toner image is conveyed to a fixing device 148 by a conveying belt 147. The fixing device 148 includes a fixing roller 157 incorporating a heater and a pressuring roller 158 to fix the toner image onto the sheet by heat and pressuring force. The image forming part 140 ejects the sheet passed through the fixing device 148 to an ejected sheet tray 149.

Figure 2:
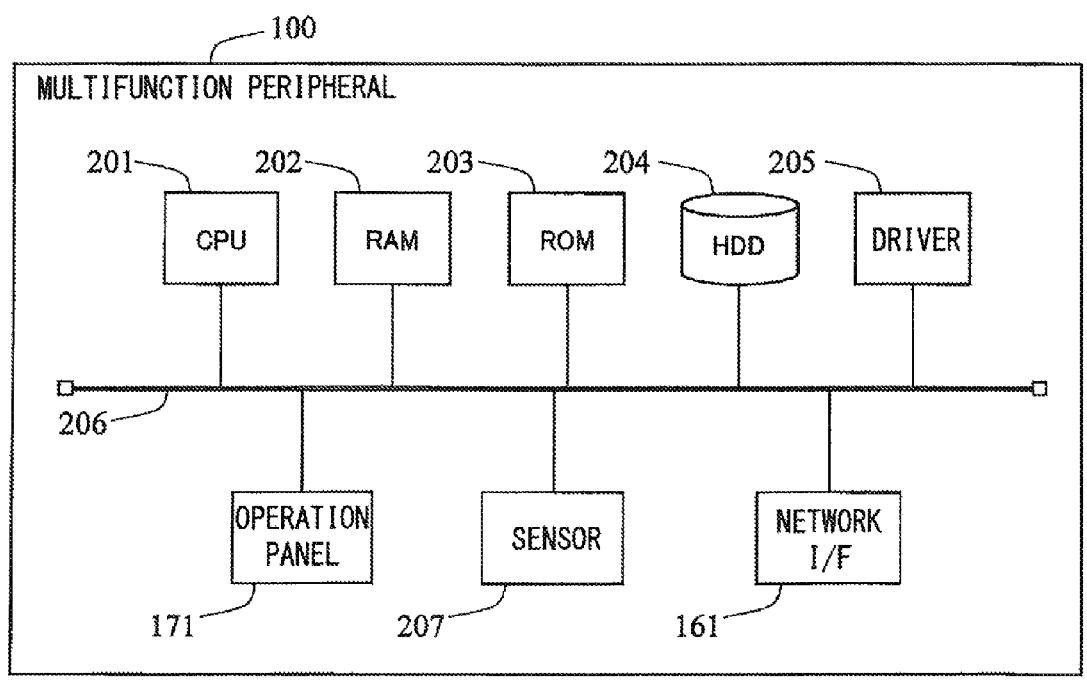
FIG. 2 is a schematic diagram showing a hardware structure of the multifunction peripheral according to the embodiment of the present disclosure.

FIG. 2 is a schematic diagram showing a hardware structure of a control system in the multifunction peripheral. In the multifunction peripheral 100 of the embodiment, a central processing unit (CPU) 201, a random access memory (RAM) 202, a read only memory (ROM) 203, a hard disk memory (HDD) 204 and a driver 205 are connected via an internal bus 206. The driver 205 corresponds with respective driving parts for the document conveying device 110, image reading part 120 and image forming part 140. The ROM 203 and HDD 204 store programs and the CPU 201 controls the multifunction peripheral 100 in accordance with instructions of such a control program. For example, the CPU 201 utilizes the RAM 202 as a workspace to receive and transmit data and command with respect to the driver 205, thereby controlling operation of the above-mentioned driving part. Moreover, the HDD 204 is utilized to store the image data obtained by the image reading part 120 and the image date received via the network interface 161 from other equipment.

To the internal bus 206, the operation panel 171, network interface 161 and various sensors 207 are also connected. The operation panel 171 receives operation of the user and transmits a signal on the basis of the operation to the CPU 201. The operation panel 171 includes a display (a touch panel) and displays an operation screen in accordance with a control signal from the CPU 201 onto the display. The sensors 207 has an open/close sensor of the paten cover 102, a document sensor on the document platen 103, a temperature sensor of the fixing device 148, a conveyed sheet/document sensor ant other sensors.

For example, the CPU 201 executes the program stored in the ROM 203 to actualize the following measures (functional blocks) and to control operation of the each measure in accordance with the signal from the sensor.

Figure 3:
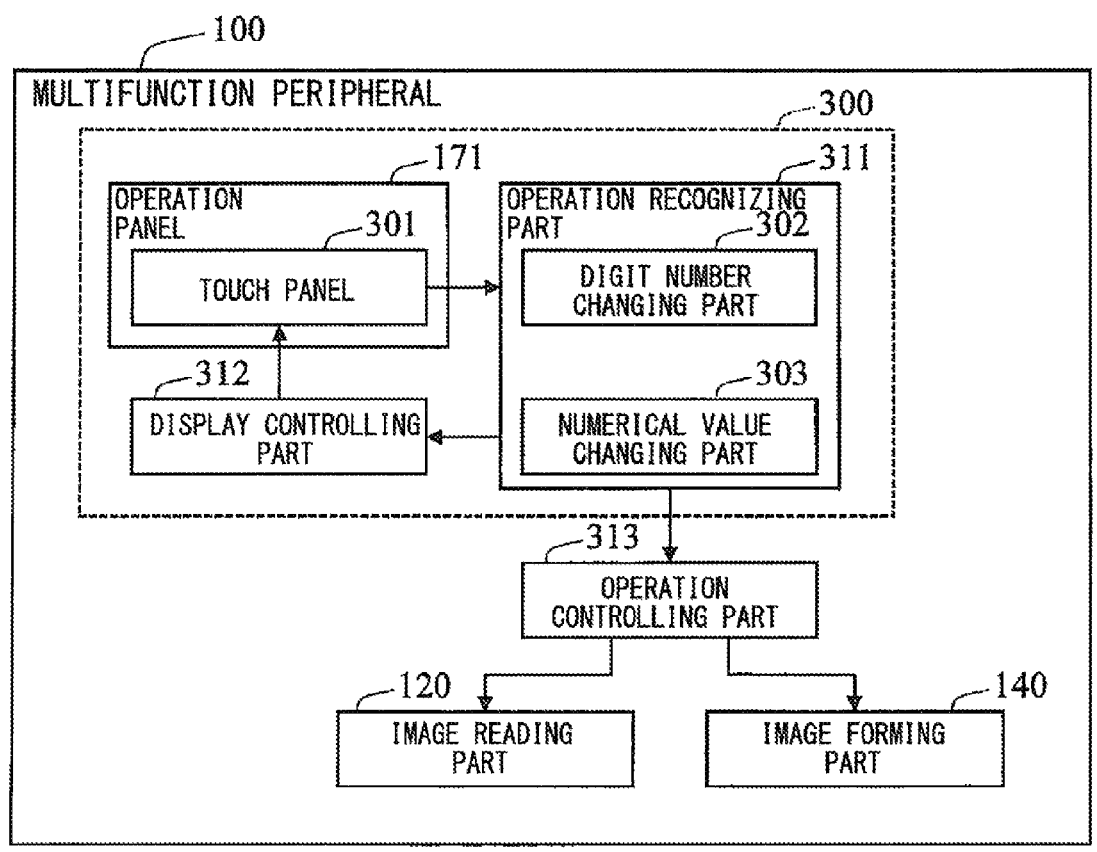
FIG. 3 is a block diagram showing functional components in the multifunction peripheral according to the embodiment of the present disclosure.

FIG. 3 is a block diagram showing the multifunction peripheral of the embodiment. As shown in FIG. 3, the multifunction peripheral 100 of the embodiment includes a touch panel 301 displaying the operation screen onto the operation panel 171, an operation recognizing part 311, a display controlling part 312. In this example, these constitute a numerical value inputting device 300.

The touch panel 301 is provided with a display face and a sensor. The display face is composed of a liquid crystal display or the like displaying a numerical value display area. The sensor detects a pressed position on the display face. The touch panel 301 is configured so as to enable to simultaneously detect at least two pressed positions on the display face. A detecting manner of the pressed position is not restricted. As the detecting manner, a voluntary manner, such as a resistive film type manner, an electrostatic capacity type manner, an elastic surface wave type manner or an electromagnetic wave type manner, may be applied. The user can carry out input via the touch panel 301 by using his/her own finger or a touch pen.

The operation recognizing part 311 recognizes the press of the touch panel 301 and recognizes an operation content of the user. Moreover, the operation recognizing part 311 displays various operation screens via the display controlling part 312 onto the display face of the touch panel 301. In the embodiment, the coordinates of the pressed position detected by the sensor detecting the pressed position of the touch panel 301 are inputted to the operation recognizing part 311. Then, the operation recognizing part 311 recognizes the operation content of the user onto the touch panel 301 on the basis of the coordinates of screen elements, such as the operation buttons, held therein and the coordinates of the inputted pressed position. In the embodiment, the operation recognizing part 311 includes a digit number changing part 302 and a numerical value changing part 303. The digit number changing part 302 and numerical value changing part 303 recognize operation relating to the numerical value input in the operation content of the touch panel by the user.

The digit number changing part 302 changes the number of digits of the numerical value displayed on the numerical value display area in accordance with separation or approach of two pressed positions onto the touch panel 301. Although a degree of changing the number of digits is not restricted, in the embodiment, when two pressed positions are overlapped with displayed position of the numerical value displayed on the numerical value display area, and then, the two pressed positions are separated along a direction arranging numeric characters of the numerical value, the digit number changing part 302 interposes new numeric character between the two pressed positions, thereby increasing the number of digits of the numerical value. Moreover, when two pressed positions are overlapped with displayed position of the numerical value displayed on the numerical value display area, and then, the two pressed positions are approached along the arranging direction of the numeric characters, the digit number changing part 302 deletes a numeric character between the two pressed positions, thereby decreasing the number of digits of the numerical value.

The numerical value changing part 303 changes a value of a numeric character in accordance with press of the numeric character constituting the numerical value displayed on the numerical value display area. For example, when at least one of two pressed positions is overlapped with the numeric character of the numerical value displayed on the numerical value display area, and then, the two pressed positions are separated along an orthogonal direction to the arranging direction of the numeric characters, the numerical value changing part 303 increases the value of the numeric character. Moreover, when at least one of two pressed positions are overlapped with the numeric character of the numerical value displayed on the numerical value display area, and then, the two pressed positions are approached along an orthogonal direction to the arranging direction of the numeric characters, the numerical value changing part 303 decreases the value of the numeric character.

The operation recognized by the operation recognizing part 311 is inputted to an operation controlling part 313. The operation controlling part 313 executes various processes, such as image data creation in the image reading part 120 and image data print in the image forming part 140, in the multifunction peripheral 100 in accordance with the operation recognized by the operation recognizing part 311.

Figure 4:
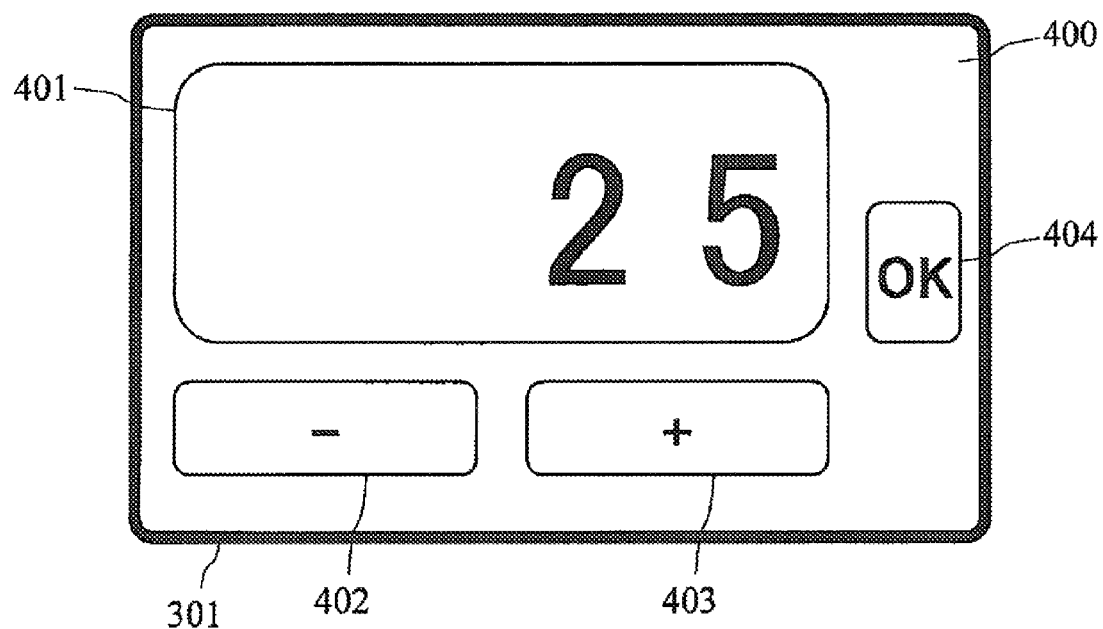
FIG. 4 is a front view showing a numerical value inputting screen as an example displayed by a numerical value inputting device in the multifunction peripheral according to the embodiment of the present disclosure.

FIG. 4 is a front view showing a numerical value inputting screen as an example displayed on the touch panel 301 when the numerical value is inputted. As shown in FIG. 4, the numerical value inputting screen 400 has a numerical value display area 401, a numerical value decreasing button 402, a numerical value increasing button 403 and an input determining button 404.

On the numerical value display area 401, a numerical value presently determined as a subjected item of a numerical value input and a numerical value in process of changing the numerical value by a numerical value inputting operation, i.e., a numerical value in inputting process, are displayed. The example in FIG. 4 indicates that the numerical value presently determined as the subjected item of the numerical value input is a value "25".

The numerical value decreasing button 402 is used for decreasing the numerical value displayed on the numerical value display area 401. For example, when the numerical value decreasing button 402 is pressed one time, the numerical value displayed on the numerical value display area 401 is decreased by a value "1". When the numerical value decreasing button 402 is pressed continuously, the numerical value displayed on the numerical value display area 401 is continuously decreased by a value "1". When the numerical value decreasing button 402 is further pressed continuously, a decreasing rate of the numerical value displayed on the numerical value display area 401 is increased.

The numerical value increasing button 403 is used for increasing the numerical value displayed on the numerical value display area 401. For example, when the numerical value increasing button 403 is pressed one time, the numerical value displayed on the numerical value display area 401 is increased by a value "1". When the numerical value increasing button 403 is pressed continuously, the numerical value displayed on the numerical value display area 401 is continuously increased by a value "1". When the numerical value increasing button 403 is further pressed continuously, an increasing rate of the numerical value displayed on the numerical value display area 401 is increased.

The input determining button 404 is used for determining the input of the numerical value.

Figure 5:
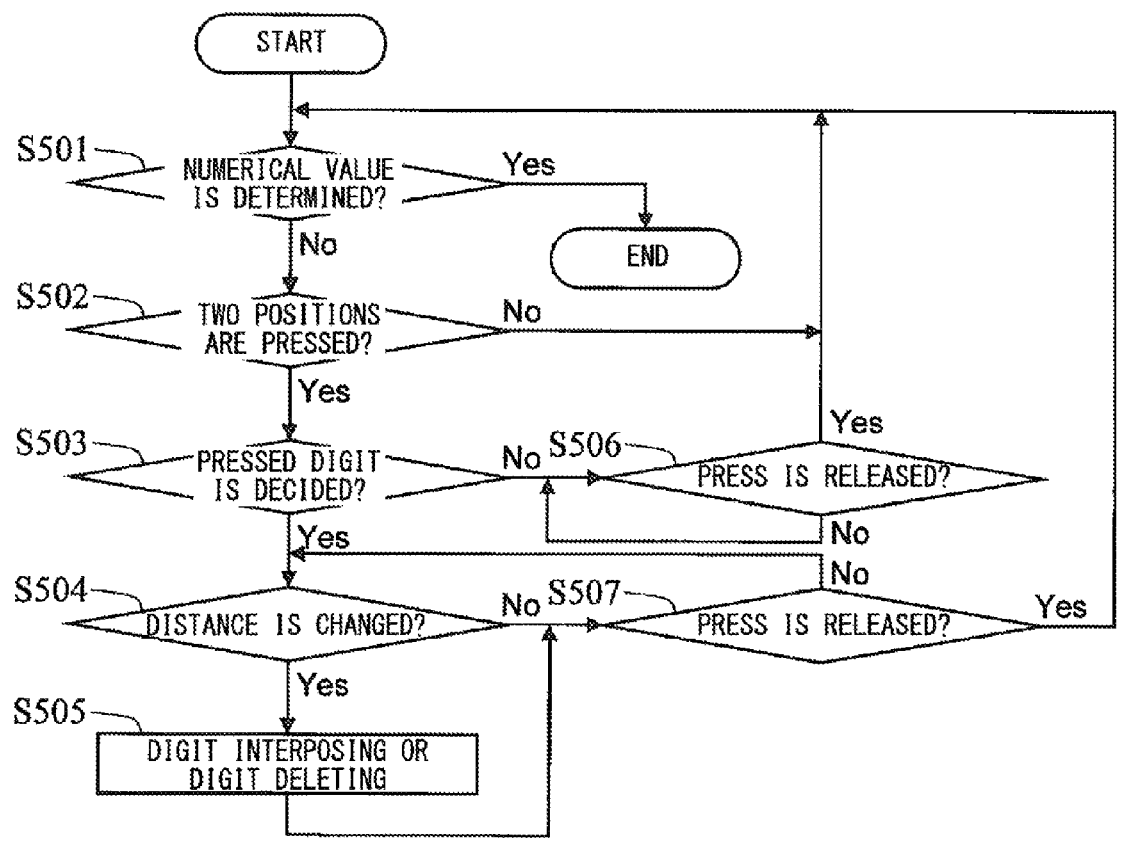
FIG. 5 is a flowchart useful for understanding a procedure as an example of changing the number of digits executed by the numerical value inputting device in the multifunction peripheral according to the embodiment of the present disclosure.

FIG. 5 is a flowchart useful for understanding a procedure as an example of changing the number of digits executed by the numerical value inputting device 300. The procedure is started by using the display of the above-mentioned numerical value inputting screen 400 on the touch panel 301 as a trigger.

When the procedure is started, the digit number changing part 302 waits until two positions are pressed on the touch panel 301 (step S501: No, step S502: No). When the two positions are pressed, the digit number changing part 302 decides whether or not the pressed positions are overlapped with the displayed position of the numerical value displayed on the numerical value display area 401 (step S503). When there is the overlap, the digit number changing part 302 decides the pressed digit (step S503: Yes). On the other hand, when the pressed positions are not overlapped with the displayed position of the numerical value displayed on the numerical value display area 401 and the pressed digit cannot be decided, the digit number changing part 302 does not anything (step S503: No). In such a case, release of the press by the user is waited (step S506: No, step S506: Yes), the digit number changing part 302 further waits until the two positions are pressed on the touch panel 301 (step S501: No, step S502: No).

Figure 6:
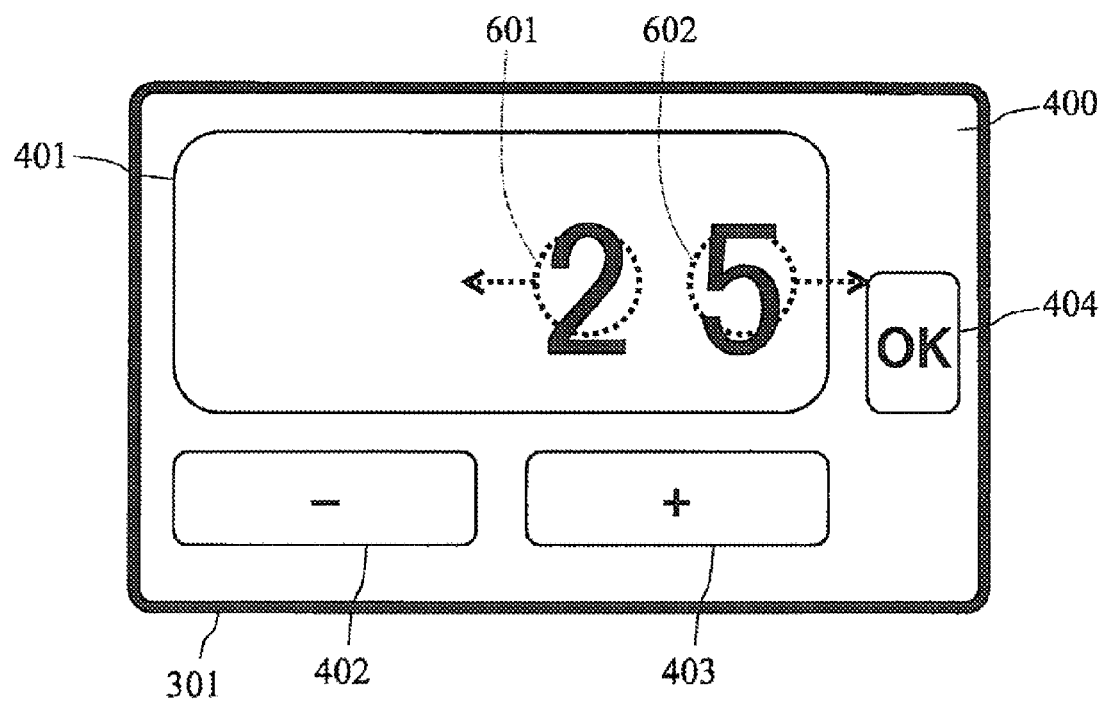
FIG. 6 is a front view showing the numerical value inputting screen of the numerical value inputting device, in which numerical value input as an example is executed, in the multifunction peripheral according to the embodiment of the present disclosure.

For example, in FIG. 6, one pressed position 601 is overlapped with a numeric character "2" of the first digit and another pressed position 602 is overlapped with a numeric character "0" of the second digit. In such a case, the digit number changing part 302 decides the "first digit" and "second digit" as the pressed digits.

The digit number changing part 302 after the decision of the pressed digits monitors separation and approach of the distance between the two pressed positions (step S504). When the press is released without the separation or the approach of the distance between the two pressed positions, the digit number changing part 302 waits until two positions are pressed on the touch panel 301 (step S504: No, step S507: Yes, step S501: No, step S502: No). On the other hand, when the distance between the two pressed positions is separated or approached without releasing the press, the digit number changing part 302 works so as to interpose or delete the digit in accordance with the separation or the approach (step S504: No, step S507: No, step S504: Yes, step S505).

For example, in the example shown in FIG. 6, when the two pressed positions 601 and 602 are separated along the arranging direction of the numeric characters of the numerical value (i.e., left and right directions on the figure), the digit number changing part 302 interposes a numeric character between the two pressed positions 601 and 602 to increase the number of digits of the numerical value. Although a degree of deciding the separation is not restricted, in the embodiment, when the distance between the two pressed positions 601 and 602 exceeds a predetermined threshold, a numeral character "0" is interposed between the two pressed positions 601 and 602 to increase the number of digits of the numerical value.

Figure 7:
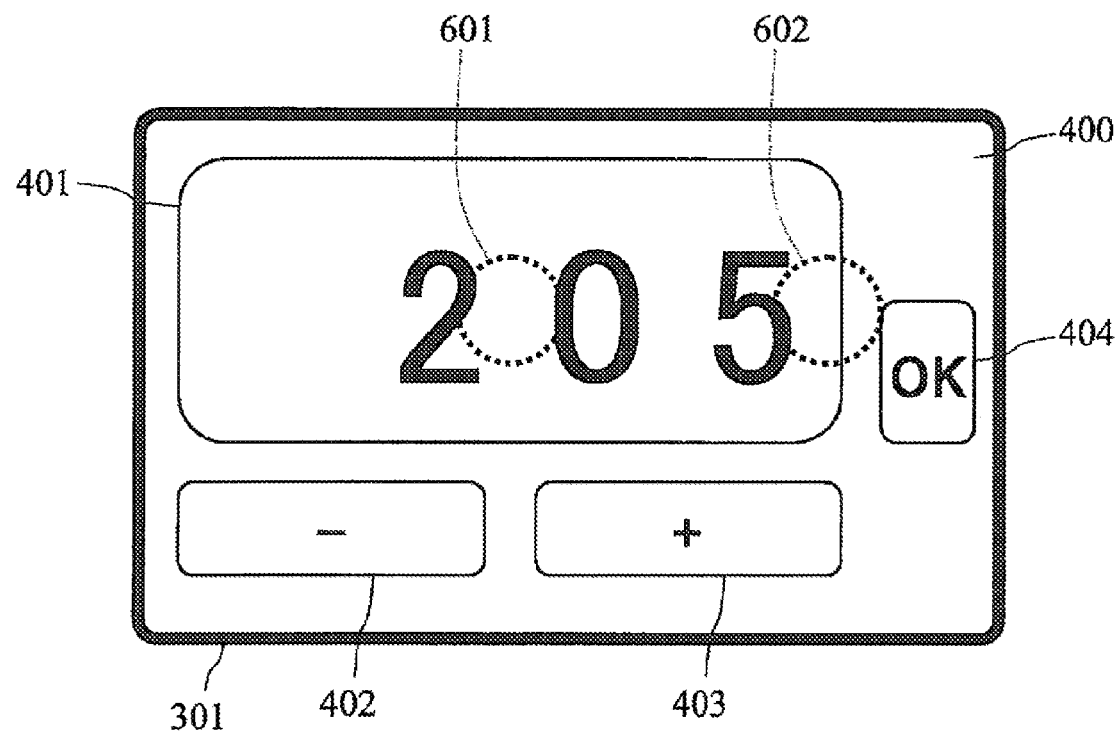
FIG. 7 is a front view showing the numerical value inputting screen of the numerical value inputting device, in which numerical value input as an example is executed, in the multifunction peripheral according to the embodiment of the present disclosure.

FIG. 7 shows the numerical value inputting screen in a state that the number of digits of the numerical value is increased. As shown in FIG. 7, when the two pressed positions 601 and 602 are separated so that the distance exceeds the threshold, the digit number changing part 302 interposes the numeral character "0" between the first digit "2" decided by the pressed position 601 and second digit "5" decided by the pressed position 602. In such a state, when the user releases the press, the numerical value display area 401 becomes a state that the numerical value "205" is inputted (step S507: Yes). At this time, when the user presses the input determining button 404, the input of the numerical value displayed on the numerical value display area 401 is determined (step S501: Yes).

Figure 8:
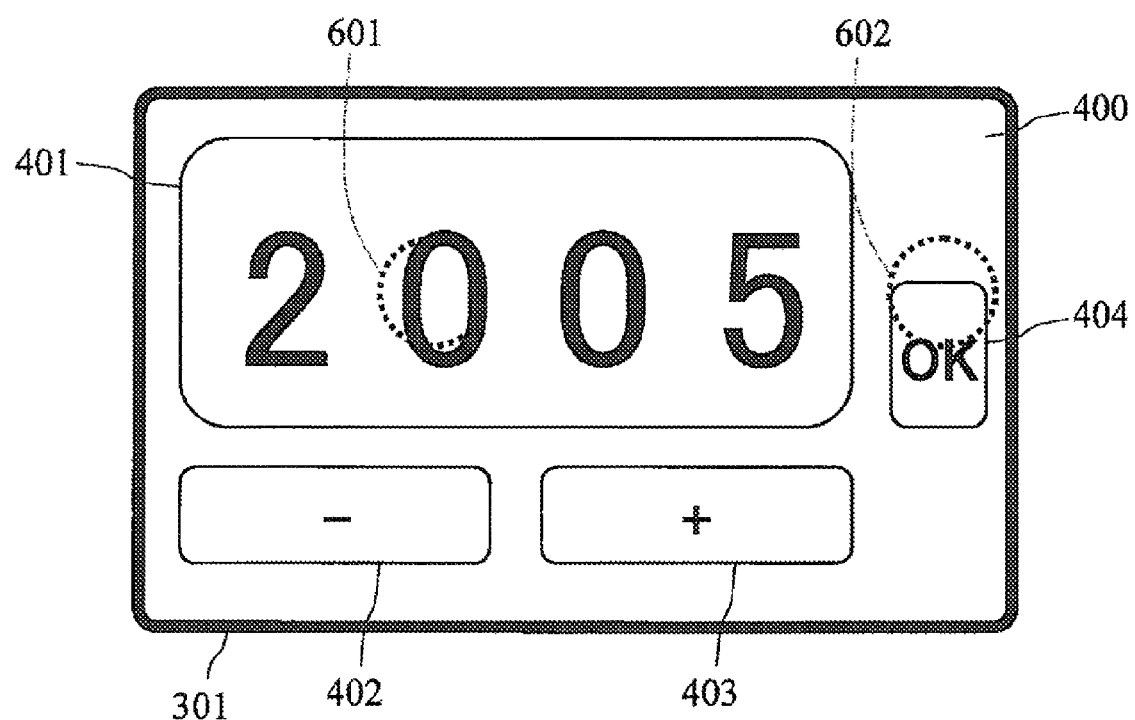
FIG. 8 is a front view showing the numerical value inputting screen of the numerical value inputting device, in which numerical value input as an example is executed, in the multifunction peripheral according to the embodiment of the present disclosure.

Although the degree of deciding the separation is not restricted, in the embodiment, in the state shown in FIG. 7, when the two pressed positions 601 and 602 are moved without releasing the press and separated so that the distance exceeds twice the threshold, the digit number changing part 302 interposes, as shown in FIG. 8, two digits of the numeral characters "0" between the first digit "2" decided by the pressed position 601 and second digit "5" decided by the pressed position 602.

When the numerical value having the increased digit number is changed, the numerical value decreasing button 402 and numerical value increasing button 403 can be used as mentioned above. However, in the embodiment, the numerical value changing part 303 can be used for increasing and decreasing the numerical value having the increased digit number.

Figure 9:
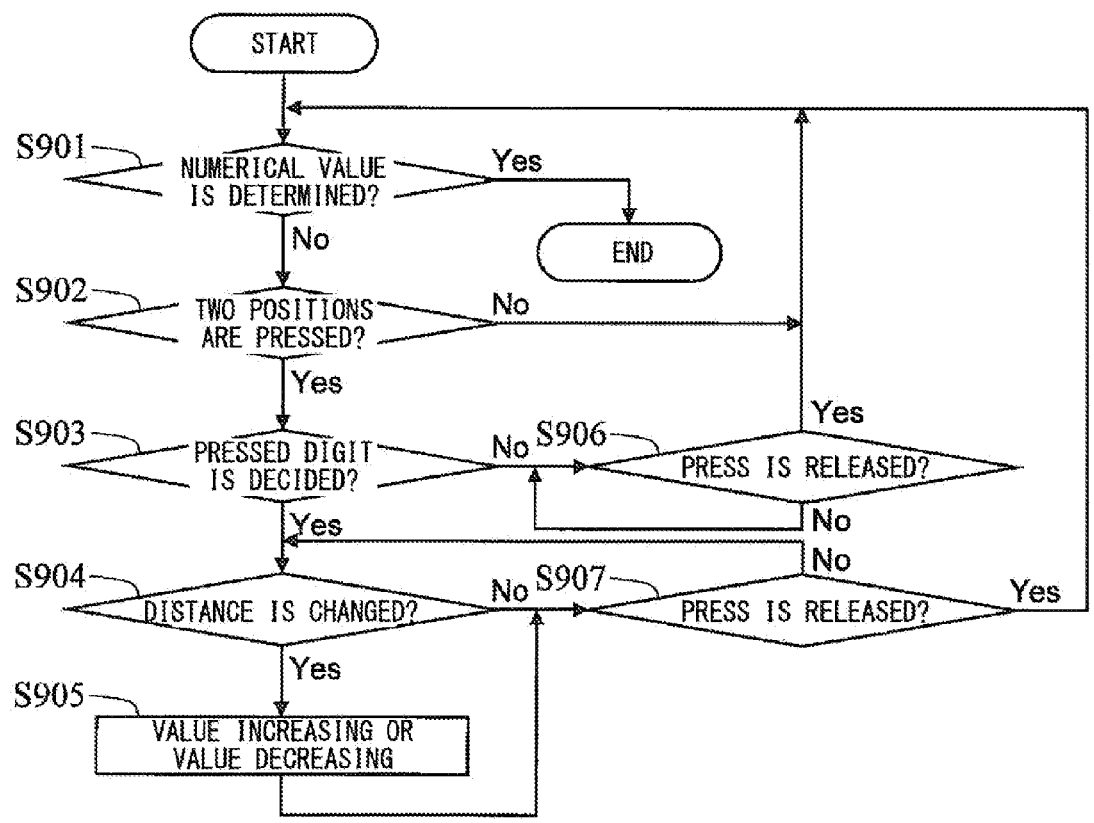
FIG. 9 is a flowchart useful for understanding a procedure as an example of changing the numerical value executed by the numerical value inputting device in the multifunction peripheral according to the embodiment of the present disclosure.

FIG. 9 is a flowchart useful for understanding a procedure as an example of changing the numerical value executed by the numerical value inputting device 300. The procedure is started by using the display of the above-mentioned numerical value inputting screen 400 on the touch panel 301 as a trigger. Incidentally, the procedure of this flowchart may be executed simultaneously in parallel with the procedure of the flowchart shown in FIG. 5.

When the procedure is started, the numerical value changing part 303 waits until two positions are pressed on the touch panel 301 (step S901: No, step S902: No). When the two positions are pressed, the numerical value changing part 303 decides whether or not at least one of the two pressed positions is overlapped with the numeric character constituting the numerical value displayed on the numerical value display area 401 (step S903). When there is the overlap, the numerical value changing part 303 decides the pressed digit (step S903: Yes). On the other hand, when the pressed positions are not overlapped with the numeric character constituting the numerical value displayed on the numerical value display area 401 and the pressed digit cannot be decided, the numerical value changing part 303 does not anything (step S903: No). In such a case, the numerical value changing part 303 waits release of the press by the user (step S906: No, step S906: Yes), and further, waits until the two positions are pressed on the touch panel 301 (step S901: No, step S902: No).

Figure 10:
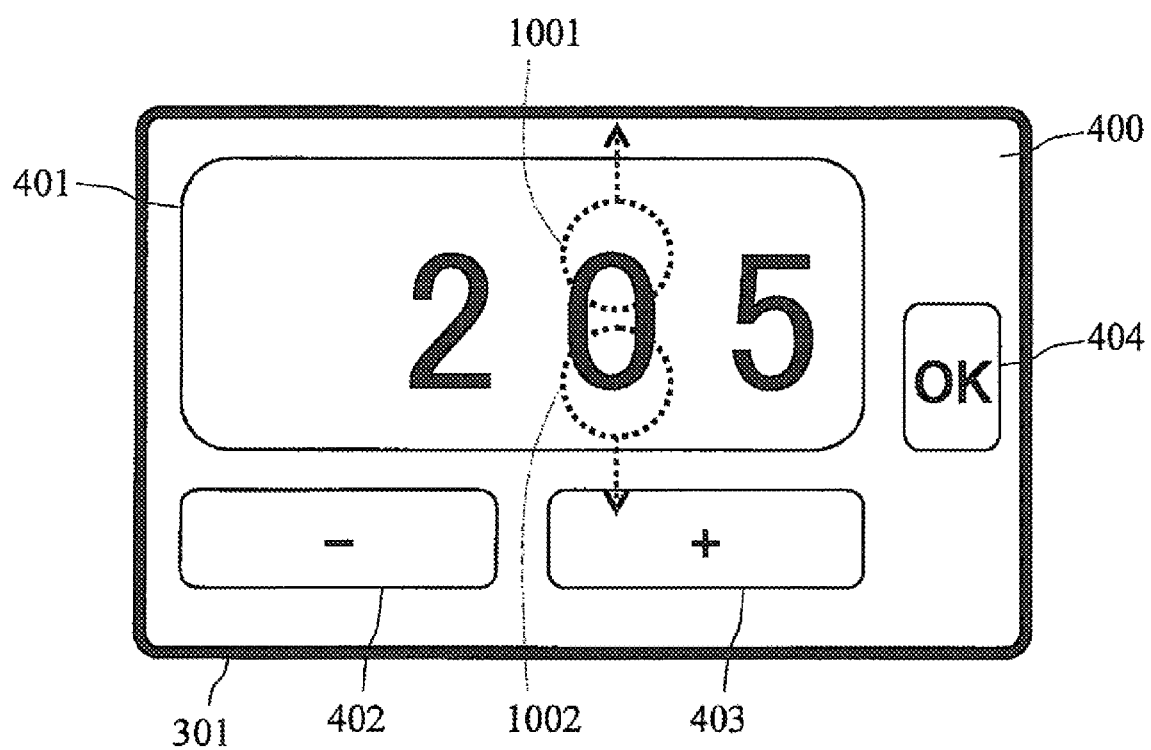
FIG. 10 is a front view showing the numerical value inputting screen of the numerical value inputting device, in which numerical value input as an example is executed, in the multifunction peripheral according to the embodiment of the present disclosure.

For example, in FIG. 10, the pressed position 1001 and pressed position 1002 are overlapped with the numeral character "0" of the second digit. In such a case, the numerical value changing part 303 decides the "second digit" as the pressed digits. Incidentally, although both the pressed position 1001 and pressed position 1002 are overlapped with the numeral character "0" of the second digit here, if at least one pressed position is overlapped with the numeral character "0" of the second digit, the pressed digit can be decided.

The numerical value changing part 303 after the decision of the pressed digit monitors separation and approach of the distance between the two pressed positions (step S904). When the press is released without the separation or the approach of the distance between the two pressed positions, the numerical value changing part 303 waits until two positions are pressed on the touch panel 301 (step S904: No, step S907: Yes, step S901: No, step S902: No). On the other hand, when the distance between the two pressed positions is separated or approached without releasing the press, the numerical value changing part 303 works so as to increase the numerical value or decrease the numerical value in accordance with the separation or the approach (step S904: No, step S907: No, step S904: Yes, step S905).

For example, in the example shown in FIG. 10, when the two pressed positions 1001 and 1002 are separated along the orthogonal direction (for example, upward and downward directions on the figure) to the arranging direction of the numeric characters of the numerical value, the numerical value changing part 303 increases the value of the numeric character of the decided digit. Although a degree of increasing the numerical value is not restricted, in the embodiment, the value of the numeric character of the digit decided by the two pressed positions is increased in accordance with an increasing amount of the distance in the upward and downward directions on the figure. That is, in accordance with the increase of the distance between the two pressed positions 1001 and 1002, the value of the numeric character of the second digit is increased by a value "1".

On the other hand, when the two pressed positions 1001 and 1002 are approached along the orthogonal direction (for example, the upward and downward directions on the figure) to the arranging direction of the numeric characters of the numerical value, the numerical value changing part 303 decreases the value of the numeric character of the decided digit. Although a degree of decreasing the numerical value is not restricted, in the embodiment, the value of the numeric character of the digit decided by the two pressed positions is decreased in accordance with a decreasing amount of the distance in the upward and downward directions on the figure. That is, in accordance with the decrease of the distance between the two pressed positions 1001 and 1002, the value of the numeric character of the second digit is decreased by a value "1".

Figure 11:
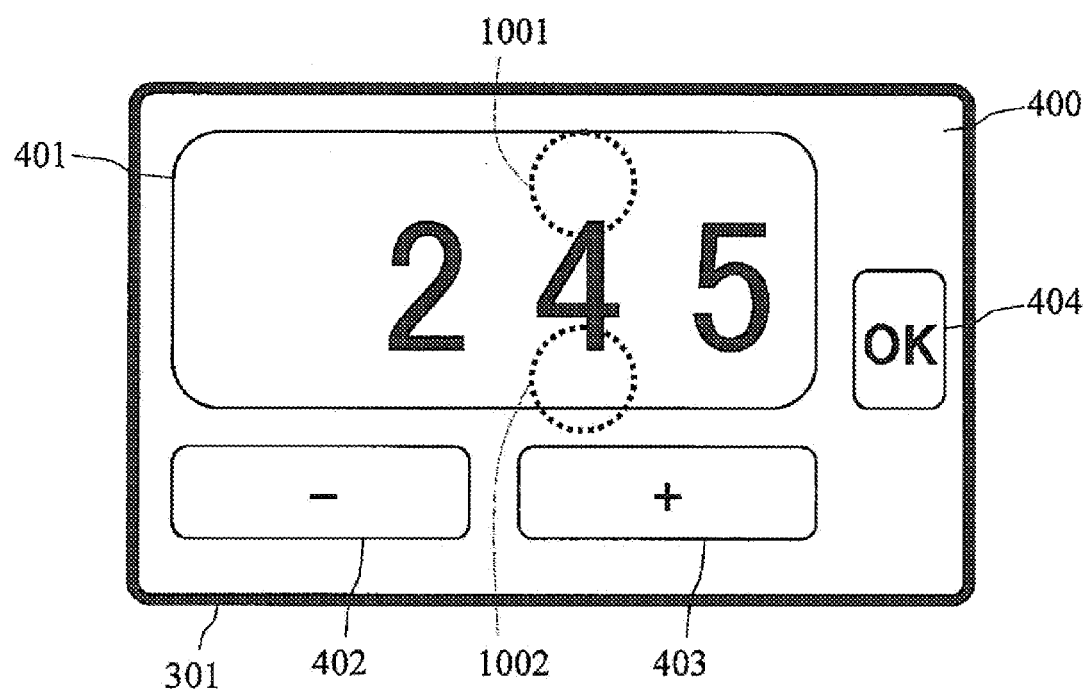
FIG. 11 is a front view showing the numerical value inputting screen of the numerical value inputting device, in which numerical value input as an example is executed, in the multifunction peripheral according to the embodiment of the present disclosure.

FIG. 11 shows the numerical value inputting screen in a state that the numerical value is increased. In FIG. 11, the state that the numeric character of the second digit is changed from a value "0" to a value "4" by the above-mentioned operation is illustrated. In the state, when the user releases the press, the numerical value display area 401 becomes a state that the numerical value "245" is inputted (step S907: Yes). At this time, when the user presses the input determining button 404, the input of the numerical value displayed on the numerical value display area 401 is determined (step S901: Yes).

Incidentally, the numerical value changing part 303 may be configured to increase the numerical value by recognizing another operation to the touch panel 301. For example, the numerical value changing part 303 may configured to decide the numeric character being overlapped with the pressed position on the touch panel 301 from the numeric characters constituting the numerical value displayed on the numerical value display area 401 and to increase the value of the numeric character of the decided digit whenever the press of the numeric character is continued for a predetermined time.

Figure 12:
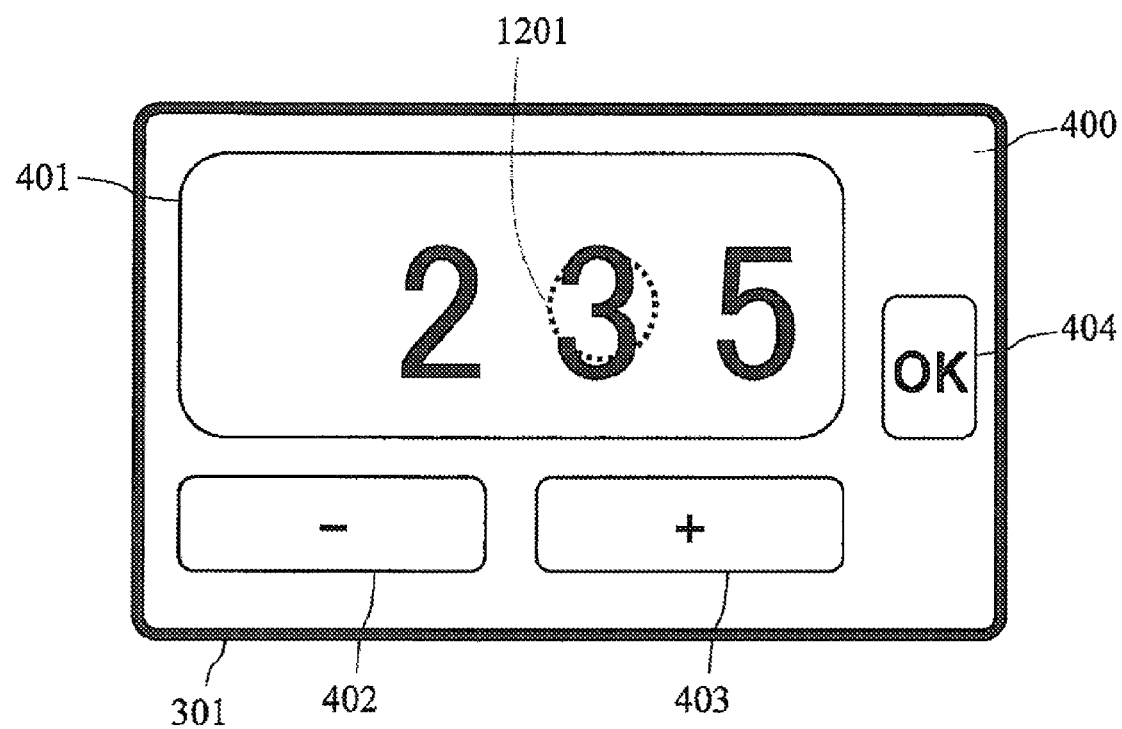
FIG. 12 is a front view showing the numerical value inputting screen of the numerical value inputting device, in which numerical value input as an example is executed, in the multifunction peripheral according to the embodiment of the present disclosure.

For example, in an example shown in FIG. 12, the pressed position 1201 is overlapped with the numeric character of the second digit. In such a case, the numerical value changing part 303 decides the "second digit" as the pressed digit. Subsequently, the numerical value changing part 303 increases the value of the numeric character of the second digit whenever the press of the second digit is continued for the predetermined time. FIG. 12 illustrates a state that the numeric character of the second digit of the example in FIG. 10 is changed from a value "0" to a value "3" by the above-mentioned operation. Incidentally, in such a configuration, it is preferable that, when the press is continued for the determined time after the numeric character of the decided digit reaches a value "9", the numerical value changing part 303 changes the numeric character of the decided digit to a value "0", and then, increases the value of numeric character of the decided digit whenever the press is continued for the predetermined time. Thus, by the configuration of circulating the value of the numeric character of the decided digit, it is possible to improve convenience in the numerical value input.

Such a configuration of circulating the value of the numeric character of the decided digit and increasing (or decreasing) the value may be applied to the above-mentioned configuration executing the value increase or the value decrease in accordance with the separation or the approach when the distance between the two pressed positions is separated or approached. In such a case, when the distance between the pressed positions is further increased after the numeric character of the decided digit reaches a value "9" in process of increasing the value of the numeric character of the decided digit, the numerical value changing part 303 changes the numeric character of the decided digit to a value "0". After that, when the distance between the pressed positions is furthermore increased, the numerical value changing part 303 increases the value of the numeric character of the decided digit in accordance with the increase of the distance between the pressed positions. Moreover, when the distance between the pressed positions is further decreased after the numeric character of the decided digit reaches a value "0" in process of decreasing the value of the numeric character of the decided digit, the numerical value changing part 303 changes the numeric character of the decided digit to a value "9". After that, when the distance between the pressed positions is furthermore decreased, the numerical value changing part 303 decreases the value of the numeric character of the decided digit in accordance with the decrease of the distance between the pressed positions.

Figure 13:
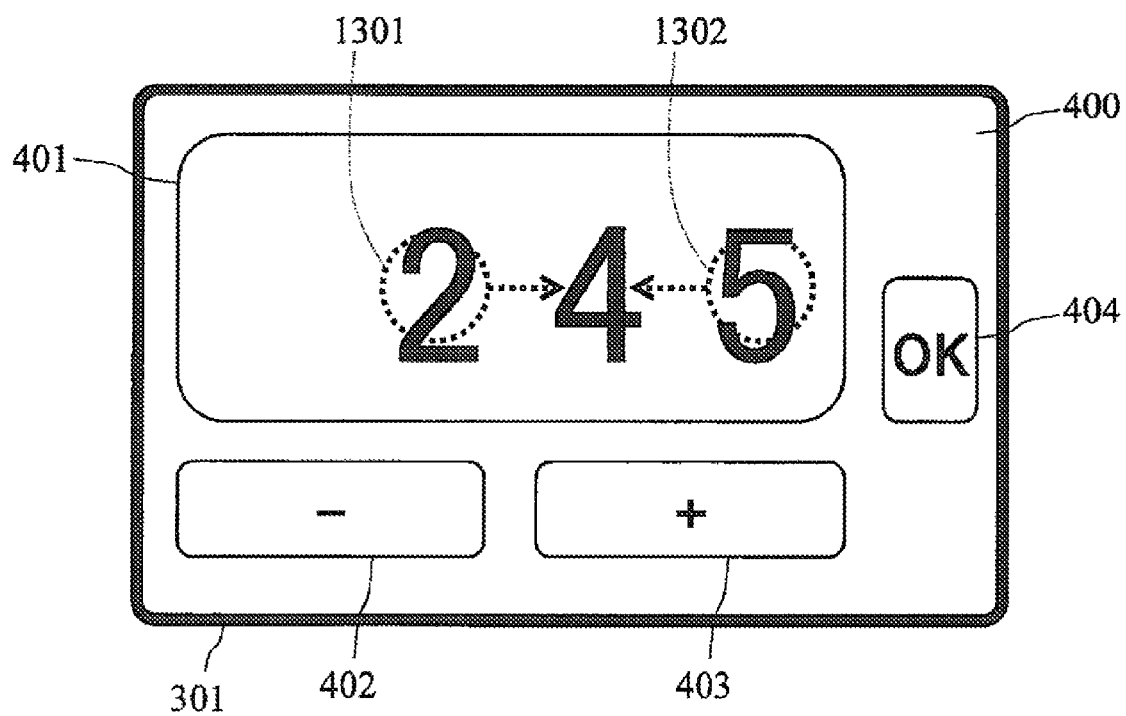
FIG. 13 is a front view showing the numerical value inputting screen of the numerical value inputting device, in which numerical value input as an example is executed, in the multifunction peripheral according to the embodiment of the present disclosure.

Next, an operation of decreasing the number of digits will be described. For example, as shown in FIG. 13, in a state that the numerical value "245" is displayed on the numerical value display area 401, one pressed position 1301 is overlapped with a numeric character "2" of the first digit and another pressed position 1302 is overlapped with a numeric character "5" of the third digit. In such a case, the digit number changing part 302 decides the "first digit" and "third digit" as the pressed digit (step S503: Yes).

In such an example, when the two pressed positions 1301 and 1302 are approached along the arranging direction of the numeric characters (i.e., the left and right directions on the figure), the digit number changing part 302 deletes the numeric character between the two pressed positions 1301 and 1302 to decrease the number of digits (step S504: Yes, step S505). Although a degree of decreasing the number of digits is not restricted, in the embodiment, when the two pressed positions 1301 and 1302 are approached so that the distance is less than a predetermined threshold, the number of digits is decreased by deleting a numeric character "4" between the pressed positions 1301 and 1302.

Figure 14:
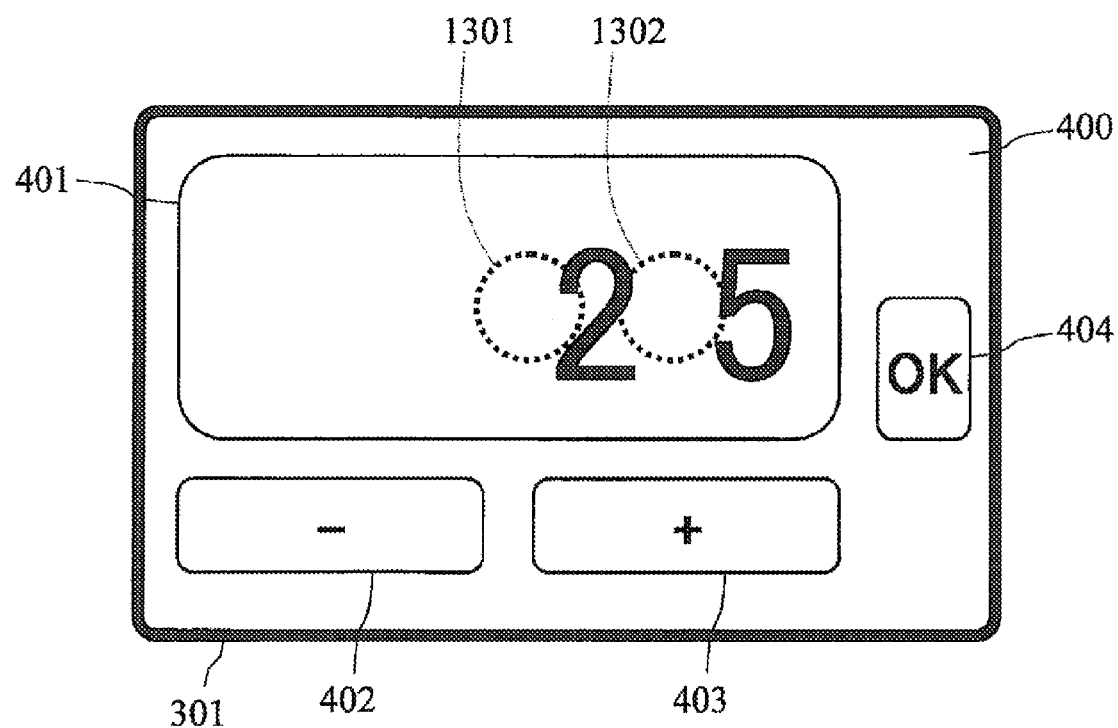
FIG. 14 is a front view showing the numerical value inputting screen of the numerical value inputting device, in which numerical value input as an example is executed, in the multifunction peripheral according to the embodiment of the present disclosure.

FIG. 14 shows the numerical value inputting screen in a state that the numerical value is decreased. As shown in FIG. 14, when the two pressed positions 1301 and 1302 are approached so that the distance is less than the predetermined threshold, the digit number changing part 302 deletes the numeric character "4" between the numeric character "2" of the first digit decided by the pressed position 1301 and the numeric character "5" of the third digit decided by the pressed position 1302. In the state, when the user releases the press, the numerical value display area 401 becomes a state that the numerical value "2" is inputted (step S507: Yes). At this time, when the user presses the input determining button 404, the input of the numerical value displayed on the numerical value display area 401 is determined (step S501: Yes).

Incidentally, although the degree of decreasing the number of digits is not restricted, when there are the numeric characters of double or more digits between the two pressed positions, the numeric characters of the double digits may be deleted by one time operation.

As described above, in the multifunction peripheral 100, it is possible to change the number of digits of the numerical value in accordance with the separation of the two pressed positions, such as a pinch out of expanding the distance between two touching fingers, and the approach of the two pressed positions, such as a pinch in of narrowing the distance between two touching fingers. That is, it is possible to easily change the number of digits of the numerical value without arranging an input interface, such as numeric keys, onto the display face. Therefore, for example, if the touch panel has the small screen size, it is possible to easily operate the input of large numerical value and the change of setting value from large numerical value to small numerical value.

Moreover, in the embodiment, since the multifunction peripheral 100 is configured to arrange the numerical value changing part 303 changing the value of the numeric character in accordance with the press of the numeric character constituting the numerical value displayed on the numerical value display area, it is possible to easily change the value of the numeric character of each digit without arranging an input interface, such as numeric keys, onto the display face.

Incidentally, the technical scope is not restricted by the above-described embodiment, and the embodiment can be variously changed or modified within the scope of the present disclosure except for the still description. For example, although in the above-described embodiment, the increase of the number of digits and the change of the numerical value are actualized by different operations, these may be actualized by the same operation. For example, when the two pressed positions are separated along the arranging direction of the numeric characters and the distance between the two pressed positions exceeds a predetermined threshold, the digit number changing part 302 interposes the numeric character "0" between the pressed position 601 and 602 to increase the number of digits of the numerical value. Subsequently, when the two pressed positions are further moved without releasing the press to expand the distance, the value of the numeric character of the interposed digit is increased in accordance with an increasing amount of the distance between the two pressed positions. Thereby, it is possible to actualize the increase of the number of digits and the change of the numerical value by the same operation. Incidentally, in such a case, the configuration of circulating the value of the decided digit and increasing the value when the numerical value is increased may be applied.

In the flowcharts shown in FIGS. 5 and 9, the order of the steps and others may be suitably modified within scope providing equivalent effects.

In addition, although, in the above-described embodiment, the present disclosure is actualized as the digital multifunction peripheral, the disclosure may be applied to voluntary electronic equipment or a voluntary image forming apparatus, such as a printer or a copying machine. Further, the disclosure also may be applied to a voluntary operation device having a resistive film type touch panel.

The present disclosure is valuable as a numerical value inputting device and electronic equipment without damaging operability regardless a small screen size.

What is claimed is:

1. A numerical value inputting device, comprising:
   a touch panel including a display face to display a numerical value display area and detecting simultaneously two pressed positions onto the display face; and
   a digit number changing part changing the number of digits of a numerical value displayed on the numerical value display area in accordance with separation or approach of the two pressed positions,
   wherein, the digit number changing part, in a case where the two pressed positions are overlapped with displayed position of the numerical value displayed on the numerical value display area, increases the number of digits of the numerical value by interposing a predetermined numeric character between the two pressed positions, when the two pressed positions are separated along an arranging direction of the numeric characters of the numerical value, and decreases the number of digits of the numerical value by deleting a numeric character between the two pressed positions, when the two pressed positions are approached along the arranging direction of the numeric characters.

2. The numerical value inputting device according to claim 1, further comprising:
   a numerical value changing part changing a value of a numeric character in accordance with press of the numeric character constituting the numerical value displayed on the numerical value display area.

3. The numerical value inputting device according to claim 2, wherein
   the numerical value changing part, in a case where at least one of the two pressed positions is overlapped with the numeric character constituting the numerical value displayed on the numerical value display area, increases the value of the numeric character, when the two pressed positions are separated along an orthogonal direction to the arranging direction of the numeric characters, and decreases the value of the numeric character, when the two pressed positions are approached along the orthogonal direction to the arranging direction of the numeric characters.

4. The numerical value inputting device according to claim 2, wherein
the numerical value changing part increases or decreases the value of the decided digit, whenever the press of the numeric character decided by the two pressed positions on the numerical value display area is continued for a predetermined time.

5. The numerical value inputting device according to claim 2, wherein
the numerical value changing part circulates and increases or decreases the value of the numeric character decided by the two pressed positions on the numerical value display area.

6. Electronic equipment comprising:
a numerical value inputting device,
wherein the numerical value inputting device includes:
a touch panel including a display face to display a numerical value display area and detecting simultaneously two pressed positions onto the display face; and
a digit number changing part changing the number of digits of a numerical value displayed on the numerical value display area in accordance with separation or approach of the two pressed positions,
wherein, the digit number changing part, in a case where the two pressed positions are overlapped with displayed position of the numerical value displayed on the numerical value display area, increases the number of digits of the numerical value by interposing a predetermined numeric character between the two pressed positions, when the two pressed positions are separated along an arranging direction of the numeric characters of the numerical value, and decreases the number of digits of the numerical value by deleting a numeric character between the two pressed positions, when the two pressed positions are approached along the arranging direction of the numeric character.

7. The electronic equipment according to claim 6, wherein the numerical value inputting device further includes:
a numerical value changing part changing a value of a numeric character in accordance with press of the numeric character constituting the numerical value displayed on the numerical value display area.

8. The electronic equipment according to claim 7, wherein
the numerical value changing part, in a case where at least one of the two pressed positions is overlapped with the numeric character constituting the numerical value displayed on the numerical value display area, increases the value of the numeric character, when the two pressed positions are separated along an orthogonal direction to the arranging direction of the numeric characters, and decreases the value of the numeric character, when the two pressed positions are approached along the orthogonal direction to the arranging direction of the numeric characters.

9. The electronic equipment according to claim 7, wherein
the numerical value changing part increases or decreases the value of the decided digit, whenever the press of the numeric character decided by the two pressed positions on the numerical value display area is continued for a predetermined time.

10. The electronic equipment according to claim 7, wherein
the numerical value changing part circulates and increases or decreases the value of the numeric character decided by the two pressed positions on the numerical value display area.

11. The numerical value inputting device according to claim 1, wherein
the digit number changing part, when the two pressed positions are separated along the arranging direction of the numeric characters and a distance between the two pressed positions exceeds a predetermined threshold, interposes the numeric character of 0 between the two pressed position to increase the number of digits of the numerical value, and then, when the two pressed positions are further moved without releasing the press to expand the distance, increases the value of the numeric character of the interposed digit in accordance with an increasing amount of the distance between the two pressed positions.

12. The electronic equipment according to claim 6, wherein
the digit number changing part, when the two pressed positions are separated along the arranging direction of the numeric characters and a distance between the two pressed positions exceeds a predetermined threshold, interposes the numeric character of 0 between the two pressed position to increase the number of digits of the numerical value, and then, when the two pressed positions are further moved without releasing the press to expand the distance, increases the value of the numeric character of the interposed digit in accordance with an increasing amount of the distance between the two pressed positions.

* * * * *